June 20, 1933.   W. P. HEARN   1,914,423
WATER SUPPLY SYSTEM AND VALVE THEREFOR
Filed Nov. 23, 1931   2 Sheets-Sheet 1
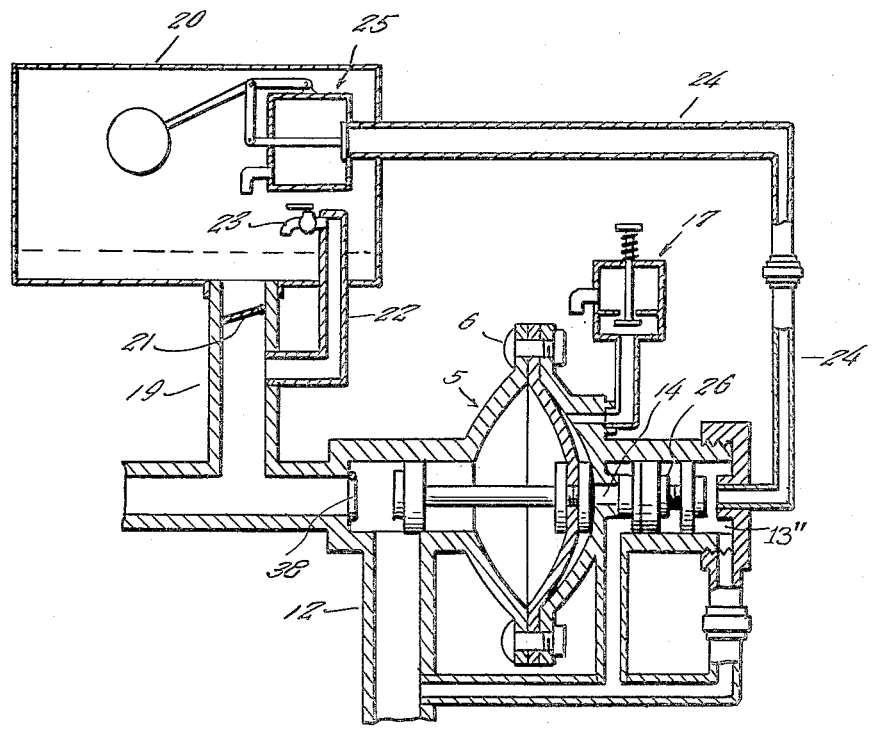
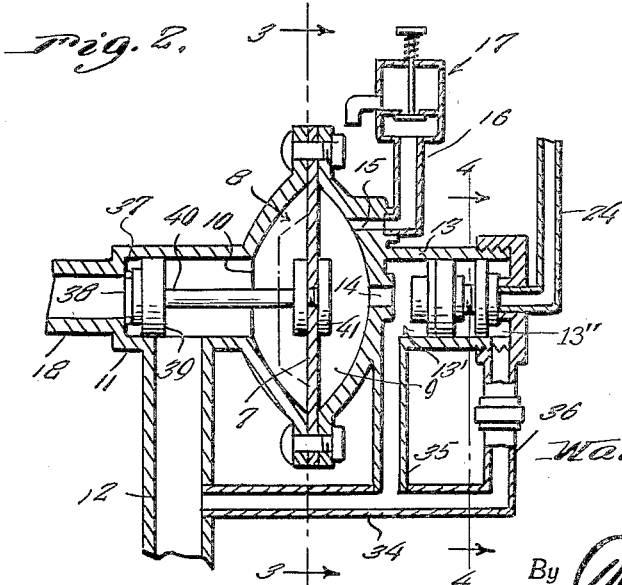
Inventor
Walter P. Hearn
By Clarence A. O'Brien
Attorney

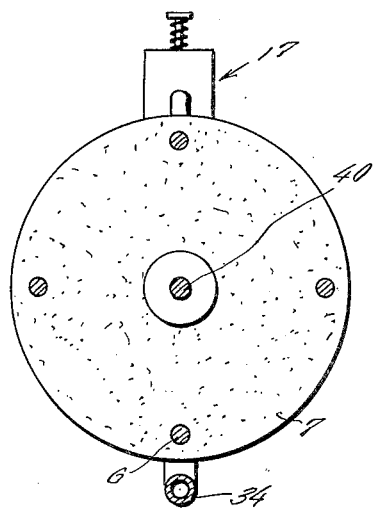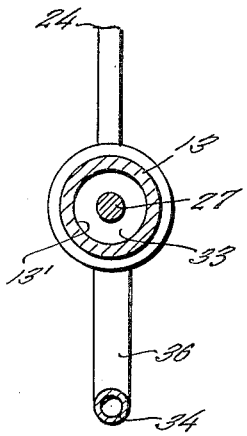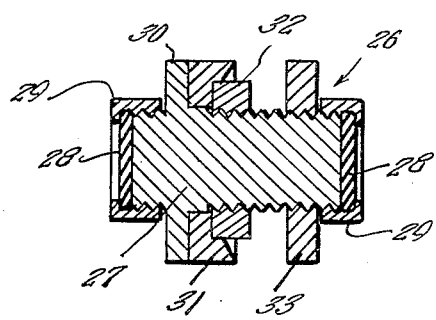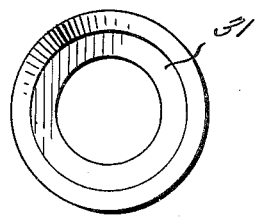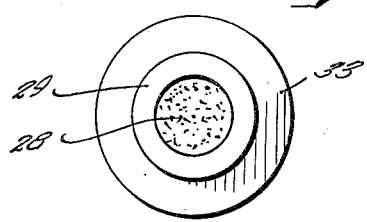

Patented June 20, 1933

1,914,423

UNITED STATES PATENT OFFICE

WALTER P. HEARN, OF TUCSON, ARIZONA

WATER SUPPLY SYSTEM AND VALVE THEREFOR

Application filed November 23, 1931. Serial No. 576,910.

This invention relates to supply systems for supplying water to a sprinkling system and the primary object of the invention is to provide a valve for controlling the passage of water from a source of supply to the sprinkler system.

A still further object of the invention is to provide a valve for the purpose above mentioned which is automatic in operation, and which provides for an efficient supply of water to sprinkling systems for use either in irrigation, or for dwellings or quenching or controlling fires.

Other objects and advantages of the invention will become apparent from a study of the following description taken in connection with the accompanying drawings wherein:

Figure 1 is a sectional elevational view through the valve, the same being shown in a water supply system.

Figure 2 is a view similar to Figure 1, with parts of the system removed, and showing the valve in a second control position.

Figures 3 and 4 are vertical transverse sectional views taken substantially on the lines 3—3 and 4—4 respectively of Figure 2.

Figure 5 is a transverse sectional view through a reciprocating valve member.

Figure 6 is a plan view of a leather cup forming part of the structure of the valve plunger shown in Figure 5.

Figure 7 is an end view of the valve plunger.

While the valve may be arranged in any desired system, either for supplying water to a spray system for use in irrigation or for other purposes, it will be seen that I have shown the valve as arranged in a sprinkler system used for irrigation and only such parts of the system as will be necessary for complete understanding of the purpose and operation of my improved valve will be hereinafter referred to.

The improved valve comprises a casing 5, the same being substantially circular and formed of two half sections which at their meeting ends are provided with outstanding flanges suitably apertured for accommodating clamping bolts 6. Arranged in the valve casing is a diaphragm 7 that at its peripheral edge is clamped between the flanges of the casing sections, and at said edge being also provided with suitable openings for accommodating clamping bolts 6. The diaphragm 7 divides the casing 5 into a pair of chambers 8 and 9.

For the chamber 8 is provided a port 10 and extending from the port is a tubular neck 11 to which is connected one end of a pipe 12 leading from a suitable source of supply.

In alignment with the neck 11, the casing is also provided with a tubular extension 13 providing a chamber 13' and a port 14 communicates or connects the chambers 9 and 13'. For the chamber 9 there is also provided an outlet port 15 from which leads a pipe 16 the outer end of which is controlled by a suitable valve designated generally by the reference character 17.

Leading from the neck 11 is a pipe 18 that leads to the sprinkler head (not shown) and this pipe 18 has a branch 19 leading therefrom to the bottom end of a tank 20, and a check valve 21 controls communication between the tank 20 and branch 19. A pipe 22 also leads from the branch 19 and extends into the tank 20 and at its inner end is provided with a suitable valve 23.

Leading from the chamber 13' in line with the port 14 is a pipe 24 that terminates within the tank 20, and at the inner end of the pipe 24 is a float controlled valve 25.

Arranged to reciprocate in the chamber 13' is a plunger valve designated generally by the reference character 26. As shown clearly in Figure 5, the plunger valve 26 includes a cylindrical body 27 on each end of which is a cushion disk 28 of felt or other suitable material that is secured in contact with the body 27 through the medium of a flanged nut 29.

Inwardly from one end thereof there is integral with the body 27 a shoulder 30, and on the inner side of the shoulder there is arranged a leather cup 31 that is clamped in position between shoulder 30 and a nut 32 screwed on to the body 27. Also screwed on to the body 27 is an apertured disk 33 that is arranged at that end of the body 27 remote from the shoulder 30.

The shoulder 30, disk 33 and cup 31 have intimate contact with the peripheral wall of the chamber 13' and the valve plunger 26 is adapted to reciprocate within said chamber.

Chamber 13' on relatively opposite sides of the valve member 26 has communication with the supply pipe 12 through the medium of a pipe 34 leading from the pipe 12 and having branches 35 and 36 leading therefrom to the extension 13.

The extension 11 at its outer end is provided with a valve seat 37 with which is engageable the cushion end 38 of a valve member 39 provided on one end of a stem 40. The stem 40 at its relatively opposite end is secured to the center portion of the diaphragm 7.

In operation, assuming that the valves 25 and 17 are closed, and port 14 is open, it will be apparent that water may pass to each of the chambers 8 and 9 which neutralizes the action of diaphragm 7, allowing the pressure on upper side of valve 39 to keep it closed as in Figure 2.

Thus the parts, with the water entering both chambers 8 and 9, will be in a position shown in Figure 2. However, when it is desired to supply water from the pipe 12 to the sprinkling system, valve 17 is moved to an open position thus permitting certain of the water from chamber 9 to pass therefrom to the pipe 16 and valve 17 to reduce pressure in chamber 9.

Upon the drop of water pressure in chamber 9, the diaphragm 7 would then become flexed, so that the parts will assume position shown in Figure 1 whereupon valve 39 will be out of engagement with the seat and water from pipe 12 is free to pass through pipe 18 to sprinklers, certain of the water passing through the branch 19 to enter the tank 20 through pipe 22 and valve 23.

However keeping in mind that with the drop of pressure in chamber 9, a corresponding drop of pressure is experienced in chamber 13' due to these chambers being connected by port 14. This pressure differential in chamber 13' and 13" causes piston valve 26 to close the port 14, thus preventing water from entering chamber 9 from branch 35, thus securing valve in a permanent position as long as all parts remain in this position.

Manifestly, as long as the valve 26 is in closing position with respect to port 14, valve 39 will remain open. When the water in tank 20 has reached such level as to raise the float of valve 25, the latter valve will be opened, whereupon water from chamber 13" will flow therefrom through pipe 24 into the tank 20 thus releasing pressure on the piston valve 26, and the water passing through the branch 35 will act on the valve 26 to move the same to the position shown in Figure 2 whereby the water will pass through chamber 13' into the chamber 9 to act on the diaphragm 7 thus equalizing pressure of water that is in chamber 8 whereupon the diaphragm will move to the position shown in Figure 2 with the result that valve 39 will move to a closed position preventing further passage of water from pipe 12 to the pipe 18 and thence to the sprinkler head.

In this connection it will be noted that with the closing of the valve 39 as in Figure 2, the pressure in pipes 18 and 19 will be reduced letting check valve 21 swing open for the purpose of emptying the relatively small tank of its contents which it had slowly accumulated through pipe 22 and the adjustable valve 23 this water also being distributed out through the sprinkler supply pipe 18. It is understood of course that tank 20 is used as a device for timing the action of the valve 25, thus making the control valve automatic.

In this connection, it is to be noted that valve 17 may be placed some distance remote from casing 5, and may be placed in the ground or other suitable location, to be actuated by the foot or in any other manner manually, it being understood that the valve 17 is opened only for a small interval of time sufficient to enable a drop of water pressure in the chamber 9 which, as is thought apparent from what has gone before, initiates the opening of valve 39.

Even though I have herein shown and described the preferred embodiment of the invention, it is to be understood that the same is susceptible of further changes, modifications and improvements coming within the scope of the appended claims.

Having thus described my invention, what I claim as new is:

1. In a water supply system, a reservoir tank, a pipe leading from a source of supply, a feed pipe connected with the first mentioned pipe and with said tank, a valve including a casing having a part connected with said pipes, a valve member adapted to reciprocate within said part, a diaphragm in said casing connected with said member, a chamber, a port connecting said chamber with said valve casing on one side of said diaphragm, a piston valve mounted for reciprocation in said chamber, conduit means connecting said chamber on relatively opposite sides of said piston valve with said supply pipe, a pipe connecting said chamber with said tank, a float controlled valve on the inner end of the last named pipe within said tank, said casing being provided with a second port on the same side of said diaphragm as the first named port, a pipe leading from the second port, and a valve connected with the last named pipe.

2. In a fluid supply system the combination of a fluid-tight casing, having oppositely disposed ports, fluid supply means connected with one of said ports, a chamber connected with the other of said ports, a freely shiftable valve in said chamber controlling the last named port, conduit means connecting said supply means with said chamber at relatively opposite sides of said valve, a valve controlling the first named port, a device responsive to variations of pressure in said casing operatively connected with the last named valve, valve means connected with said chamber for releasing pressure at one side of the said freely shiftable valve, and additional valve means connected with said casing at one side of said pressure responsive device for releasing pressure in said casing at said one side of said pressure responsive device.

3. In a fluid supply system, a fluid tight casing provided with oppositely disposed ports, a chamber communicating with said casing through one of said ports, fluid supply means connected with the other of said ports, conduit means connecting said fluid supply means with said chamber at relatively opposite ends of said chamber, a piston valve arranged to reciprocate within said chamber in response to variations of pressure in said chamber, float controlled valve means connected with said chamber at the end thereof remote from said casing, a valve controlling the second named port for said casing, a flexible diaphragm disposed in said casing and extending across the interior thereof and operatively connected with the last named valve, and manually operable valve means connected with said casing for relieving pressure in said casing at one side of said diaphragm.

4. In a fluid supply system, a reservoir tank, a fluid tight casing, conduit means connecting one side of said casing with said tank and a source of supply, pressure responsive means arranged in said casing, a valve controlling communication between said conduit means and said casing and having operative connection with said pressure responsive means, a chamber connected with said casing at that side thereof opposite to the first named side of the casing, conduit connections between said chamber and the first named conduit means, a float controlled valve in said reservoir tank, a conduit connecting said float controlled valve with said chamber, means in said chamber operated by fluid pressure for controlling the passage of fluid from said chamber to said casing and also from said chamber to said tank through the aforementioned conduit connection between said chamber and said float controlled valve, and remote control means connected with said casing at one side of the pressure responsive device arranged therein for relieving fluid pressure in the casing on said one side of the pressure responsive means aforementioned.

In testimony whereof I affix my signature

WALTER P. HEARN.